US009258795B2

(12) United States Patent
Behrens et al.

(10) Patent No.: US 9,258,795 B2
(45) Date of Patent: Feb. 9, 2016

(54) AIS SHIP'S TRANSCEIVER

(71) Applicant: Deutsches Zentrum fur Luft—und Raumfahrt e. V., Koln (DE)

(72) Inventors: Jorg Behrens, Bremen (DE); Andis Dembovskis, Bremen (DE)

(73) Assignee: Deutsches Zentrum für Luft- und Raumfahrt e. V., Köln (DE)

( * ) Notice: Subject to any disclaimer, the term of this patent is extended or adjusted under 35 U.S.C. 154(b) by 157 days.

(21) Appl. No.: 14/071,692

(22) Filed: Nov. 5, 2013

(65) Prior Publication Data

US 2014/0128098 A1    May 8, 2014

(30) Foreign Application Priority Data

Nov. 5, 2012  (DE) .................... 10 2012 110 540 U (51) Int. Cl.
*H04W 24/00* (2009.01)
*H04W 64/00* (2009.01)
*G08G 3/02* (2006.01)
*H04B 7/185* (2006.01)

(52) U.S. Cl.
CPC ................. *H04W 64/00* (2013.01); *G08G 3/02* (2013.01); *H04B 7/18513* (2013.01)

(58) Field of Classification Search
CPC ............. G08G 3/02; G08G 3/00; G08G 5/04; G08G 9/02; G08G 1/205; G08G 7/00; H04B 7/18513; H04B 7/18517; H04B 7/26; H04B 7/185; B63B 2213/02; B63B 25/24; B63B 43/18; G01S 13/9307; G01S 5/0027

USPC ............... 455/39, 456.1, 11.1, 12.1; 340/988, 340/539.13, 961; 342/41, 179, 90, 26 B, 342/352, 450; 701/301, 302
See application file for complete search history.

(56) References Cited

U.S. PATENT DOCUMENTS

| | | | |
|---|---|---|---|
| 6,515,619 B1 | 2/2003 | McKay, Jr. | |
| 2008/0086267 A1 | 4/2008 | Stole et al. | |
| 2010/0056181 A1* | 3/2010 | Rippon et al. | ............. 455/456.3 |
| 2011/0109492 A1* | 5/2011 | Nakahama | ....................... 342/89 |
| 2011/0304502 A1* | 12/2011 | Chen et al. | .................... 342/352 |
| 2012/0326882 A1* | 12/2012 | Behm | ........................ 340/686.6 |

FOREIGN PATENT DOCUMENTS

DE    10 2011 113 152 A1    9/2011

OTHER PUBLICATIONS

"Improved satellite detection of AIS", Report ITU-R M.2169, Dec. 2009, Entire Document.

* cited by examiner

*Primary Examiner* — Fred Casca
(74) *Attorney, Agent, or Firm* — Whitham, Curtis, Christofferson & Cook, P.C.

(57) ABSTRACT

The invention relates to an Automatic Identification System (AIS) ship's transceiver for sending and receiving AIS radio signals, wherein the position can be taken as a basis and/or adjacent ships can be taken as a basis for activating or deactivating the emission of AIS radio signals of a second AIS radio signal type for satellite-assisted monitoring.

10 Claims, 3 Drawing Sheets

AIS SHIP'S TRANSCEIVER

BACKGROUND OF THE INVENTION

1. Field of the Invention

The invention relates to an AIS ship's transceiver that is provided for installation on a ship in order to be able to send and receive AIS radio signals containing ship data, having an AIS radio transmission unit that is designed to send radio signals of a first AIS radio signal type that contain ship data, wherein the AIS radio signals of the first AIS radio signal type are provided for the interchange of ship data from the ships among one another, and that is designed to send AIS radio signals of a second AIS radio signal type that contain ship data, wherein the AIS radio signals of the second AIS radio signal type are provided for reception by a satellite and for transmission of the ship data that the AIS radio signals of the second AIS radio signal type contain to a ground station by means of the satellite, and having an AIS radio reception unit that is designed to receive AIS radio signals of the first AIS radio signal type that contain ship data and that have been emitted by AIS ship's transceivers on adjacent ships.

The invention likewise relates to a method for the sending and receiving of AIS radio signals that contain ship data by such an AIS ship's transceiver therefor.

2. Background Description

Today, the monitoring of shipping traffic, which is increasing worldwide, is based predominantly on radar monitoring, radio telephony and on the use of AIS (Automatic Identification System). Since the year 2000, AIS has been stipulated by the International Maritime Organization (IMO) as a binding standard in order to increase the safety of international shipping traffic. This locally bounded radio system is used for the interchange of navigation data and other ship data that are intended to allow ships to obtain a comprehensive overview of the adjacent shipping traffic. The primary aim in this case is to prevent collision between ships.

An AIS ship's transceiver arranged on the ships is used to emit AIS radio signals that the relevant ship data, such as navigation data, alternately on two channels in the VHF marine radio range, namely firstly on 161.975 MHz and secondly on 162.025 MHz, using the broadcast method. In this case, the individual AIS radio signals are emitted in fixed time columns, the use of which is coordinated independently by the relevant subscribers of an AIS radio cell, known as SOT-DMA (Self Organizing Time Division Multiple Access). Therefore, there are just 2250 timeslots per minute available for transmitting data to the individual subscribers.

The AIS ship's transceiver installed on board can be used to receive the radio signals emitted by the other ships, with the ship data that the AIS radio signals contain then being able to be extracted. The reception of the ship data from various ships in the surroundings of a ship can therefore be used to derive an overview of the adjacent shipping traffic or of the adjacent ships, which means that a ship is able, by way of example, to establish the direction in which and the speed at which adjacent ships that are not directly visible, for example on account of poor visibility, are traveling. It is therefore possible to avoid collisions and to produce a substantially improved, albeit locally bounded, picture of the situation.

On account of the VHF frequency band used, the radio range of AIS from ship to ship corresponds to approximately 40 to 60 km, which corresponds to a little more than the usual range of vision on the high sea. Coastal stations can cover a radius of up to 100 km as a result of their relatively high position. On account of the limited range and also the SOT-DMA transmission protocol used, ships that are able to see and receive one another form an AIS radio cell within which the subscribers can send and receive without collision.

Hence, the AIS is merely a local radio system that, although it provides sufficient timeslot capacity for a ship on the high sea, is unsuitable for a worldwide, in particular satellite-based, survey of shipping traffic, since the coverage of a satellite includes many individual AIS radio cells. For shipping companies, the maritime organizations or Ministries of the Environment, however, a realtime survey of the AIS shipping data arising worldwide would be of great interest in order to counter illegal machinations on the high sea too, in particular.

By way of example, the subsequently published DE 10 2011 113 152 A1 thus discloses a global ship monitoring system that can be used to monitor ships in shipping traffic on the high sea centrally. To this end, commercial aircraft have AIS reception units that, on their flight route, receive the AIS radio signals emitted by the ships and transmit them for further processing to a ground station. This allows almost uninterrupted coverage and monitoring to be achieved particularly on much-used routes.

In the most recent past, attempts have been made to arrange AIS reception antennas on satellites so as to be able to receive the AIS radio signals emitted worldwide using a satellite system. By way of example, US 2008/0086267 A1 thus discloses a satellite-based system in which an AIS reception unit is arranged on the satellites in order to be able to receive the AIS radio signals emitted by the ships. The AIS information that the AIS radio signals contain is forwarded to a control center so as to obtain global monitoring of the shipping traffic. Such a satellite system can therefore be used to achieve uninterrupted monitoring even in remote regions.

Western industrial nations, in particular, require the introduction of checking of maritime traffic from space in the course of their fight against terrorism. However, satellite-based monitoring systems of this kind have the substantial disadvantage in respect of AIS radio signals in highly frequented maritime areas that it is no longer possible to detect ships with sufficient precision. On account of the extreme altitude of a satellite, a reception region with a diameter of between approximately 5000 and 6000 km is produced. Since the AIS as a local radio system is naturally organized into individual radio cells that all send on the same frequency band, such a large reception radius results in the reception of a multiplicity of radio cells having an identical transmission frequency and timeslots, however, which means that AIS radio signals from different AIS radio cells overlap and normal data processing is no longer possible. Precisely on highly frequented shipping routes or in the proximity of harbors and coasts, the reception region of the satellite covers such a large number of ships that sufficiently secure monitoring is no longer possible on account of the signal collisions.

In order to overcome this problem, two additional VHF channels for satellite-assisted monitoring using AIS radio signals will be provided in future in addition to the already existing AIS frequencies (AIS1: 161.975 MHz; AIS2: 162.025 MHz). To this end, specifically the channels on 156.775 MHz (AIS3) and 156.875 (AIS4) are intended to be allocated for communication for the purpose of receiving AIS radio signals from space by satellite. The background to the introduction of the additional satellite AIS (SAT-AIS) frequencies is the obtainment of as complete a maritime picture of the situation as possible using SAT-AIS on the high sea away from coastal regions. This is currently not possible with AIS1 and AIS2 alone for the reasons cited above (interference).

According to the definition of the ITU (ITU-R-M-1371-4), AIS3 and AIS4 radio signals are automatically switched off by the ship when the ships are in the communication range of what are known as AIS ground stations (AIS base stations), which are usually installed on the coast. When a ship receives a "Base Station Report" (Message 4), emitted by an AIS ground station, with the request to shut down SAT-AIS (control bit for "Transmission control for longrange broadcast message"), the AIS ship's transceiver installed on the ship deactivates the emission of the AIS3/AIS4 radio signals for satellite-assisted monitoring. The effect intended to be achieved by this is that in coastal regions, which usually have a high level of traffic on account of the concentration of the shipping traffic, no AIS3/AIS4 radio signals are intended to be emitted so as not to interfere with the satellite reception on account of a large number of radio signals that may overlap one another. The monitoring is then effected by means of the AIS ground stations. If the ship is outside the communication range of an AIS ground station, the emission of the AIS3/AIS4 radio signals for satellite-assisted monitoring is automatically switched on again by the ship.

However, there is currently only a very small number of such AIS ground stations worldwide, with usually only pure AIS reception stations being operated in the area close to the coast, which AIS reception stations, although sufficient for monitoring ships close to the coast, are unable to emit an AIS ground station message on account of the lack of transmission unit, and therefore the AIS ship's transceiver continues to emit AIS3/AIS4 radio signals in the communication range of AIS ground reception units even in proximity to the coast. As a result, in the absence of an AIS ground station, the problem arises in proximity to the coast that the ships continue to emit their AIS radio signals for satellite-assisted monitoring on the AIS3/AIS4 frequencies, however, which means that collisions occur in the case of satellites that these on account of the large number of radio signals, as a result of which it is no longer possible to safeguard adequate monitoring of the shipping traffic even with the newly introduced frequencies.

SUMMARY OF THE INVENTION

Against this background, it is an object of the present invention to specify an improved AIS ship's transceiver and a method therefor that can be used to reduce or avoid signal collisions, particularly in highly frequented shipping traffic areas, when emitting AIS3/AIS4 radio signals for satellite-assisted monitoring, so as to improve the quality of the satellite-assisted monitoring by means of AIS3/AIS4 radio signals.

The invention achieves the object by means of the ship's AIS transceiver being controlled such that the position of the ship can be taken as a basis and/or the presence of adjacent ships can be taken as a basis for activating or deactivating the emission of AIS radio signals of a second AIS radio signal type for satellite-assisted monitoring.

According to the invention, an AIS ship's transceiver of the type cited at the outset has a control unit that is set up a) to deactivate and/or to activate the sending of the AIS radio signals (AIS3/AIS4) of the second AIS radio signal type (SAT-AIS) by the AIS radio transmission unit on the basis of a current ship position ascertained by a position finding unit, and/or b) to deactivate and/or to activate the sending of the AIS radio signals (AIS3/AIS4) of the second AIS radio signal type (SAT-AIS) by the AIS radio transmission unit on the basis of a number of adjacent ships.

According to the invention, in line with the first aspect of the invention (point a)), the sending of the AIS radio signals (AIS3/AIS4) of the second AIS radio signal type is intended to be activated or deactivated on the basis of a current ship position so as to prevent the emission of AIS radio signals when the ship is at a relevant position and/or to activate the emission of the AIS radio signals for the satellite-assisted communication (AIS3/AIS4) when the ship is on the high sea, for example, which can be established as a result of the current ship position ascertained by a position finding unit.

The effect that can be achieved by this is that ships shut down the emission of the AIS3/AIS4 radio signals for the satellite-assisted monitoring on the basis of their ship position so as to reduce or avoid the risk of signal collisions during satellite-assisted monitoring in waters or regions with dense traffic, for example, on account of the high density of ships. Thus, although the ships on which the emission of the satellite-assisted AIS radio signals has been switched off, can no longer be tracked by means of the satellite monitoring system, the fact that the regions with dense traffic are usually close to the coast and hence in range of reception stations means that appropriate monitoring of the ships can take place via ground stations, while the monitoring of other ships can take place via the satellite-assisted monitoring system of the AIS3/AIS4 radio signals. This prevents total failure of the satellite-assisted monitoring on account of an excessive density of ships in a particular area throughout the reception region of the satellite.

In line with a second aspect of the invention (point b)), the control unit of the AIS ship's transceiver may, as an alternative or in addition to point a), be set up such that the sending of the AIS radio signals (AIS3/AIS4) of the second AIS radio signal type (SAT-AIS) is deactivated and/or activated by the AIS radio transmission unit on the basis of a number of adjacent ships.

The effect that can be achieved by this is that a random increase in the density of ships in a particular portion of the reception region of the satellite prompts the emission of the AIS radio signals for the satellite-assisted monitoring to be shut down for some ships, as a result of which reception of AIS3/AIS4 radio signals does not become impossible throughout the reception region of the satellite on account of signal collisions. On the contrary, the effect that can be achieved by this is that in the subregion of the reception region of the satellite in which the density of ships has randomly accumulated and increased, the emission of the AIS radio signals therefrom for the satellite-assisted monitoring is switched off, as a result of which at least other ships in the reception region of the satellite can continue to be checked and monitored by means of the satellite-assisted monitoring.

The overriding concept of the invention is therefore that of suppressing the emission of AIS radio signals (AIS3/AIS4) for the satellite-assisted monitoring by an AIS ship's transceiver when there is the risk of a sharp increase in the density of ships in a particular portion of the reception region of the satellite meaning that the resultant signal collisions when the AIS3/AIS4 radio signals are emitted would lead to a reception blackout throughout the reception region of the satellite. The reason is that this would result in secure reception of the AIS3/AIS4 radio signals no longer being possible throughout the reception region of the satellite. The invention solves this firstly by means of the position of the ship (point a)) and/or by means of the actual number of adjacent ships (point b)).

Within the context of the present invention, an AIS ship's transceiver is understood to mean a device that can be used to emit AIS radio signals and to receive AIS radio signals. An interface connects such AIS ship's transceivers to further equipment or devices not infrequently in order to ascertain relevant ship data that are intended to be emitted to other ships by using the AIS radio signals. Thus, an AIS ship's transceiver may be connected to a position finding unit, for example, in order to be able to ascertain the current ship position. This can be done by using a GPS receiver, for example. Alternatively, it is conceivable for such a position finding unit to be an integral part of the AIS ship's transceiver.

In this case, an AIS ship's transceiver of this kind is provided and designed for installation on a ship and has the relevant features therefor.

An AIS ship's transceiver of this kind usually has an AIS radio transmission unit and an AIS radio reception unit, wherein the AIS radio transmission unit can be used to emit AIS radio signals and the AIS radio reception unit can be used to receive the radio signals that are correspondingly emitted by other ships.

In this case, an AIS radio transmission unit of this kind is designed to emit at least two different AIS radio signal types. The first AIS radio signal type (TER-AIS) is AIS radio signals (AIS1/AIS2) that are provided for the interchange of ship data from the ships among one another. Such AIS radio signals are emitted on the frequencies 161.975 MHz and 162.025 MHz and meet the standards for AIS that were settled as long ago as the year 2000. Such AIS radio signals of the first AIS radio signal type are accordingly also received by the reception units on other ships, and the ship data that these AIS radio signals contain are accordingly extracted and evaluated so as to be able to produce the cooperative picture of the situation in the shipping traffic on the individual ships.

As a distinction in this regard, the AIS radio transmission units can furthermore emit AIS radio signals (AIS3/AIS4) of a second AIS radio signal type (SAT-AIS), these AIS radio signals of this radio signal type being provided for the purpose of being received not by other ships but rather by a satellite.

In line with the proposed recommendation of the ITU, AIS radio signals of this radio signal type are emitted on the VHF channels 156.775 MHz (AIS3) and 156.875 MHz (AIS4) by the AIS radio transmission units. In contrast to the AIS radio signals of the first radio signal type, the radio signals of the second radio signal type are not received by the reception units on the other ships and are used merely for the satellite-assisted monitoring.

In one advantageous embodiment, the control unit is connected to a database that stores the positions of coastlines. In this case, the control unit is now set up such that it can ascertain the distance of the ship from the coast by means of the current position of the ship and the position of the coastline that is stored in the database, as a result of which the control unit knows how far away from the closest coast the ship is at the current ship position. Using this information, the control unit now deactivates and/or activates the sending of the AIS radio signals (AIS3/AIS4) of the second AIS radio signal type, so as to deactivate the sending of the AIS radio signals of the second AIS radio signal type for the satellite-assisted monitoring close to the coast and to accordingly activate it again away from the coast, for example. The reason is that it is precisely close to the coast where there is the risk of the reception on the satellite being subject to interference on account of signal collision owing to a high density of ships.

Furthermore, this embodiment achieves the advantage that the ship does not necessarily have to be in the communication range of one of the few AIS ground stations in order for the emission of the AIS radio signals of the second AIS radio signal type to be deactivated, as a result of which the proximity of the coast means that the radio signals of the first AIS radio signal type is able to be effected by AIS reception stations on the coast, which can be found much more frequently.

Thus, global ship monitoring in proximity to the coast can be performed securely using AIS reception stations, even though the emission of the AIS radio signals of the second AIS radio signal type for the satellite-assisted monitoring is switched off and even though the ship is not in a communication range of an AIS ground station that emits a relevant AIS ground station message for switching off the emission of the second AIS radio signal type. This allows signal collisions to be reduced or avoided particularly in proximity to the coast in the reception region of the satellite.

Advantageously, the emission of the second AIS radio signal type is deactivated when the distance of the ship from the coast drops below a particular reference distance and/or the emission of the second AIS radio signal type is activated again when the distance of the ship from the coast exceeds a prescribed reference distance.

In a further advantageous embodiment, the AIS ship's transceiver is set up to ascertain the number of adjacent ships on the basis of received AIS radio signals of the first AIS radio signal type that have been emitted by adjacent ships. On account of the fact that the adjacent ships use the AIS and the underlying self-organizing protocol to form a single-digit radio cell in which they can send without collision, the AIS ship's transceiver can establish the number of ships from which it can receive AIS radio signals without collision. From this it is possible to ascertain the number of adjacent ships for the received AIS ship's transceiver. The basis used for this is the AIS radio signals (AIS1/AIS2) of the first AIS radio signal type (TER-AIS). In this case, it is conceivable for the AIS ship's transceiver itself to ascertain the number or to farm out the functionality to a separate module, for example the control unit.

In this case, it is now particularly advantageous when the control unit is set up to deactivate the sending of the AIS radio signals of the second AIS radio signal type when a particular number of adjacent ships exceeds a prescribed reference number so as to reduce or avoid the risk of a signal collision in a reception region of a satellite. Although these ships are then no longer able to be monitored and checked by means of the satellite-assisted monitoring system, this state is only usually temporary, since the random increase in the density of ships in a particular reception region of the satellite can also quickly resolve itself again. For this period, however, the satellite continues to be ready to receive throughout the reception region, which means that AIS radio signals of the second AIS radio signal type from other ships can continue to be received. There is therefore not a complete reception blackout throughout the reception region just because there has been an unusual accumulation of ships in a particular portion of the reception region.

Therefore, the control unit may furthermore additionally or alternatively be set up to activate the sending of the AIS radio signals of the second AIS radio signal type again when the ascertained number of adjacent ships drops below the prescribed reference number, as a result of which the sending of the radio signals of the second AIS radio signal type can be resumed when the density of ships decreases, and it is thus possible for the ships to be checked again by means of the satellite-assisted monitoring system.

In a further advantageous embodiment, the control unit is connected to a database that stores data regarding valid AIS ground stations. In this case, AIS ground stations are those AIS transmission and reception stations located close to the coast that also have a transmission unit besides a reception unit in order to emit an AIS ground station message (Message 4). The AIS ground station message is usually emitted using the broadcast method and is received by the ships when the ships are in the reception region of the AIS ground station. By way of example, such an AIS ground station message may be Message 4 (Base station report) from the AIS standard. Such an AIS ground station message usually contains data regarding the AIS ground station, for example an ID, the position, etc.

When such an AIS ground station message is received by a ship, the emission of the AIS radio signals of the second AIS radio signal type is automatically deactivated or activated. In the case of a Message 4 from the AIS standard, this is accomplished by setting the "Transmission control for longrange broadcast message" bit to "0" in order to deactivate sending, or setting it to "1" in order to activate sending.

The control unit is now set up such that the AIS ground station that has emitted such an AIS ground station message can be validated with the data from the database by using its data in the message. On the basis of the result of validation, the emission of the AIS radio signals of the second AIS radio signal type is then automatically activated and/or deactivated. If the result of validation leads to an invalid AIS ground station (fake), for example, then the emitted AIS ground station message is ignored and if need be the emission of the AIS radio signals of the second AIS radio signal type is automatically activated.

The advantage that can be achieved by this is that misuse of this functionality is restricted, for example when pirates use "fake ground stations" to attempt to have the emission of the radio signals of the second radio signal type automatically switched off on the ships so that the position of the ship can no longer be tracked. The use of appropriate validation prior to the automatic shutdown allows this misuse by "fake ground stations" to be avoided.

BRIEF DESCRIPTION OF THE DRAWINGS

The invention is explained in more detail with reference to the appended drawings, in which.

DETAILED DESCRIPTION THE INVENTION

Figure 1:
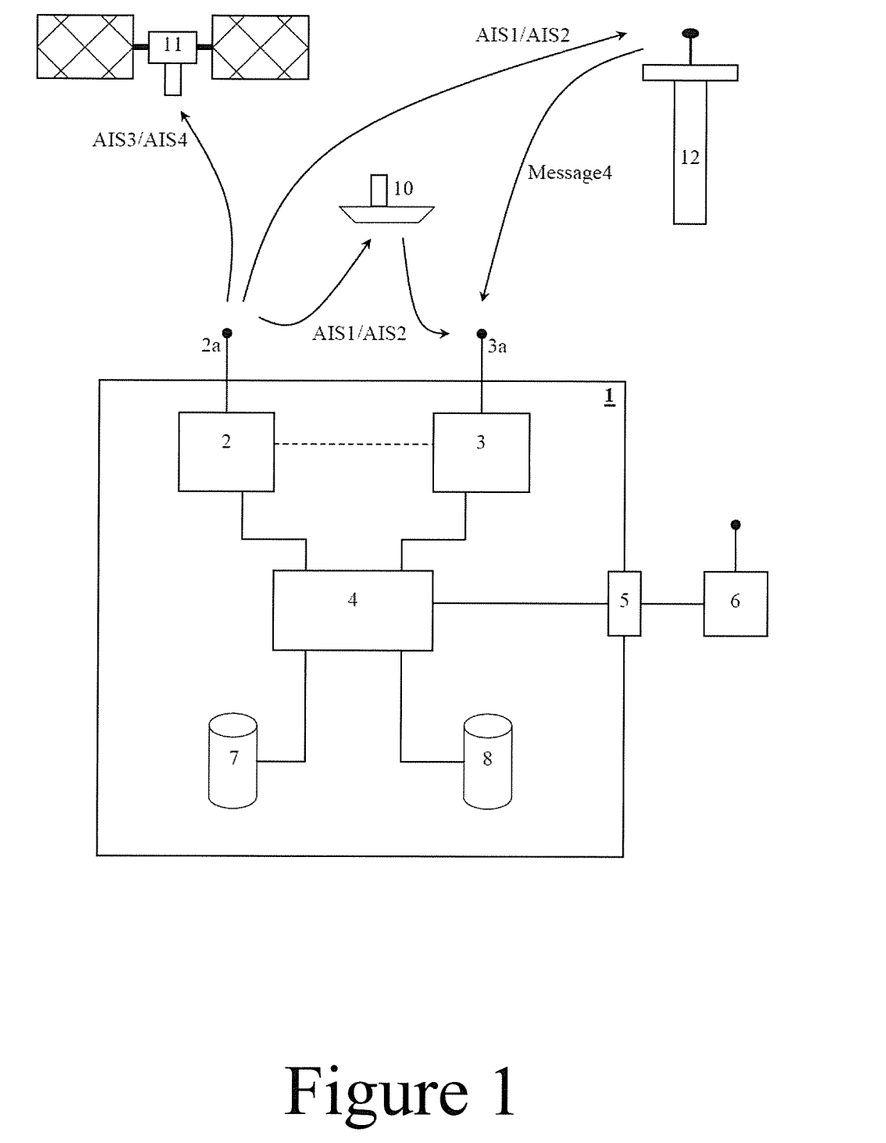
FIG. 1 shows a schematic illustration of an AIS ship's transceiver.

FIG. 1 schematically shows the inventive AIS ship's transceiver 1, which is provided and set up for installation aboard a ship. The ship's transceiver 1 has an AIS radio transmission unit 2 that can be used to emit AIS radio signals via an antenna 2a. Furthermore, the AIS ship's transceiver 1 has an AIS radio reception unit 3 that can be used to receive relevant AIS radio signals via an antenna 3a.

Furthermore, the AIS ship's transceiver 1 has a control unit 4 that is connected to the AIS radio transmission unit 2 and to the AIS radio reception unit 3 in order to deactivate or to activate the emission of the AIS radio signals of the second AIS radio signal type as appropriate. In the exemplary embodiment of FIG. 1, the control unit 4 is connected via an interface 5 of the AIS ship's transceiver 1 to a position finding unit 6 that uses a GPS receiver to ascertain the current ship position of the ship on which the AIS ship's transceiver 1 is installed and to make it available to the control unit 4.

Alternatively, it is conceivable for the functionality of the position finding for the ship to be an integral part of the AIS ship's transceiver 1.

Furthermore, the control unit 4 of the AIS ship's transceiver 1 is connected to a database 7 that stores the positions of the coastlines at least for a subregion of the earth's surface. The control unit 4 can access the data in the coast database 7.

Furthermore, the control unit 4 is connected to a database 8, storing data regarding valid AIS ground stations, for the purpose of signal interchange. These data in this database 8 can also be accessed by the control unit 4 as appropriate.

The AIS radio transmission unit 2 is now designed such that it can emit AIS radio signals AIS1/AIS2 of the first AIS radio signal type TER-AIS (Terrestrial AIS) in line with the AIS standard, these AIS radio signals AIS1/AIS2 containing ship data from the ship on which the AIS ship's transceiver 1 is installed.

These AIS radio signals AIS1/AIS2 are emitted using the broadcast method and are received by ships in reception range, as a result of which the adjacent ships 10 are able to obtain ship data from the emitting ship.

If the adjacent ship 10 has an AIS ship's transceiver 1 of the same design or similar on it, the adjacent ship 10 in turn emits its ship data using AIS radio signals AIS1/AIS2 of the first AIS radio signal type using the broadcast method, said ship data then in turn being able to be received by the AIS ship's transceiver 1 using the reception unit 3.

In line with the more recent AIS standard, the AIS radio transmission unit 2 is furthermore designed to emit AIS radio signals AIS3/AIS4 of the second AIS radio signal type, which can then be received by a satellite 11. In line with the AIS standard, the radio signals of the second AIS radio signal type are used exclusively to set up a satellite-assisted monitoring system particularly on the high sea so as to monitor the shipping traffic without interruption.

Furthermore, the AIS radio reception unit 3 is designed to receive radio signals from an AIS ground station 12, particularly what is known as a Message 4, as a result of which the AIS ship's transceiver 1 is able to establish that it is in the reception region of an AIS ground station when it has received such a Message 4. In this case, the AIS ship's transceiver 1 is designed to deactivate the emission of the AIS radio signals AIS3/AIS4 of the second AIS radio signal type, since in the communication region of the AIS ground station 12 it is possible for the AIS radio signals AIS1/AIS2 of the first AIS radio signal type to be received by the AIS ground station for the purpose of monitoring the shipping traffic. In order to avoid signal collisions in the reception region of the satellite 11, this communication path is intermittently deactivated. The control unit 4 is now set up to take the current ship position and/or to take the number of adjacent ships 10 as a basis for activating and/or deactivating the emission of the AIS radio signals AIS3/AIS4 of the second AIS radio signal type in order to avoid signal collisions in the reception region of the satellite 11.

By way of example, the control unit 4 may be set up such that it takes the current positions of the ship and the positions of the coastline stored in the database 7 as a basis for ascertaining the distance from the coast and takes this as a basis for activating or deactivating the emission of the radio signals of the second radio signal type.

Furthermore, in the exemplary embodiment in FIG. 1, the control unit is designed such that it uses the data stored in the database 8 for the valid AIS ground stations to validate the ground station 12 from which a Message 4 has been received so as to establish whether it is a valid AIS ground station and the satellite-assisted monitoring communication channel can be switched off.

Figure 2:
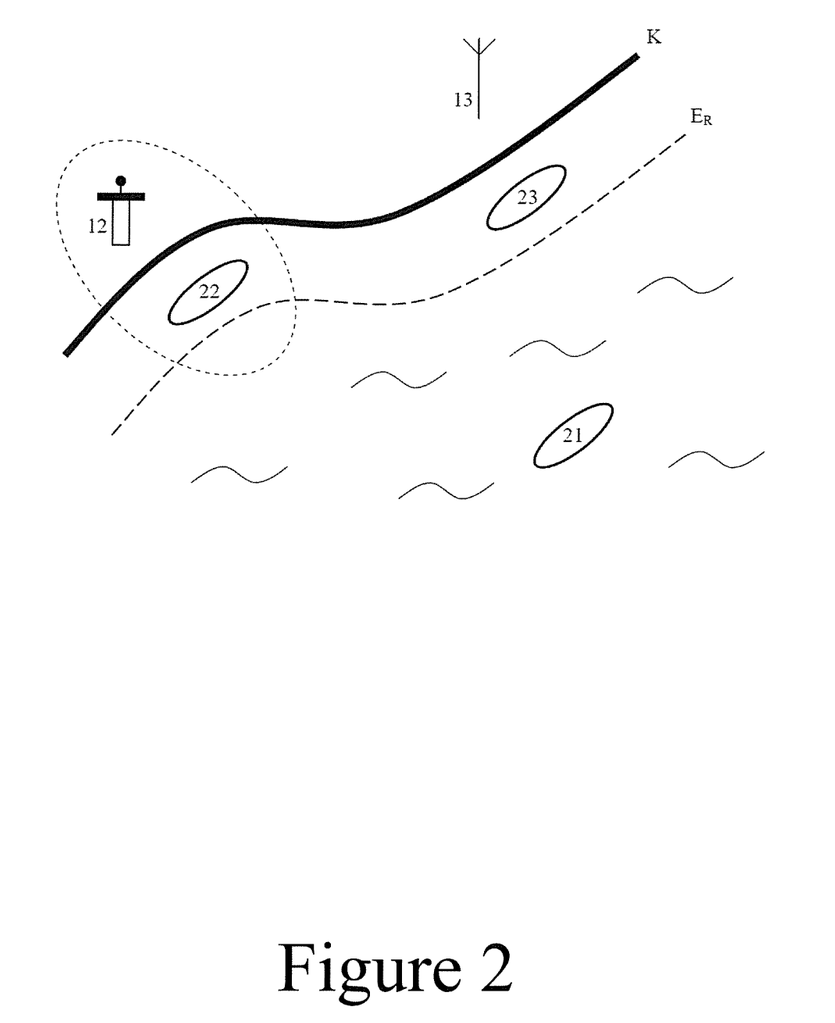
FIG. 2 shows a schematic illustration of the method in proximity to the coast.

FIG. 2 schematically shows a coastline that has a plurality of ships 21 to 23 in front of it. All the ships 21 to 23 are equipped with an AIS ship's transceiver 1 from FIG. 1 and can ascertain the distance from the coast, in particular.

In the example in FIG. 2, the ship 21 would now establish that the distance from the coast K is above a reference distance $E_R$, which means that the ship 21 emits AIS radio signals AIS3/AIS4 of the second AIS radio signal type. The ship 22 in turn is at a distance from the coast K that is within the reference distance, which means that in this case the emission of the radio signals of the second AIS radio signal type is switched off. In the example of the ship 22, the communication now takes place via an AIS ground station 12 situated nearby.

However, the ship 23 in FIG. 2 is not in the reception region of the AIS ground station 12 but is at a distance from the coast that is below the reference distance $E_R$. In this case too, the emission of the radio signals of the second AIS radio signal type is switched off, with the AIS radio signals of the first AIS radio signal type being able to be received by an AIS reception station for the purpose of monitoring.

Figure 3:
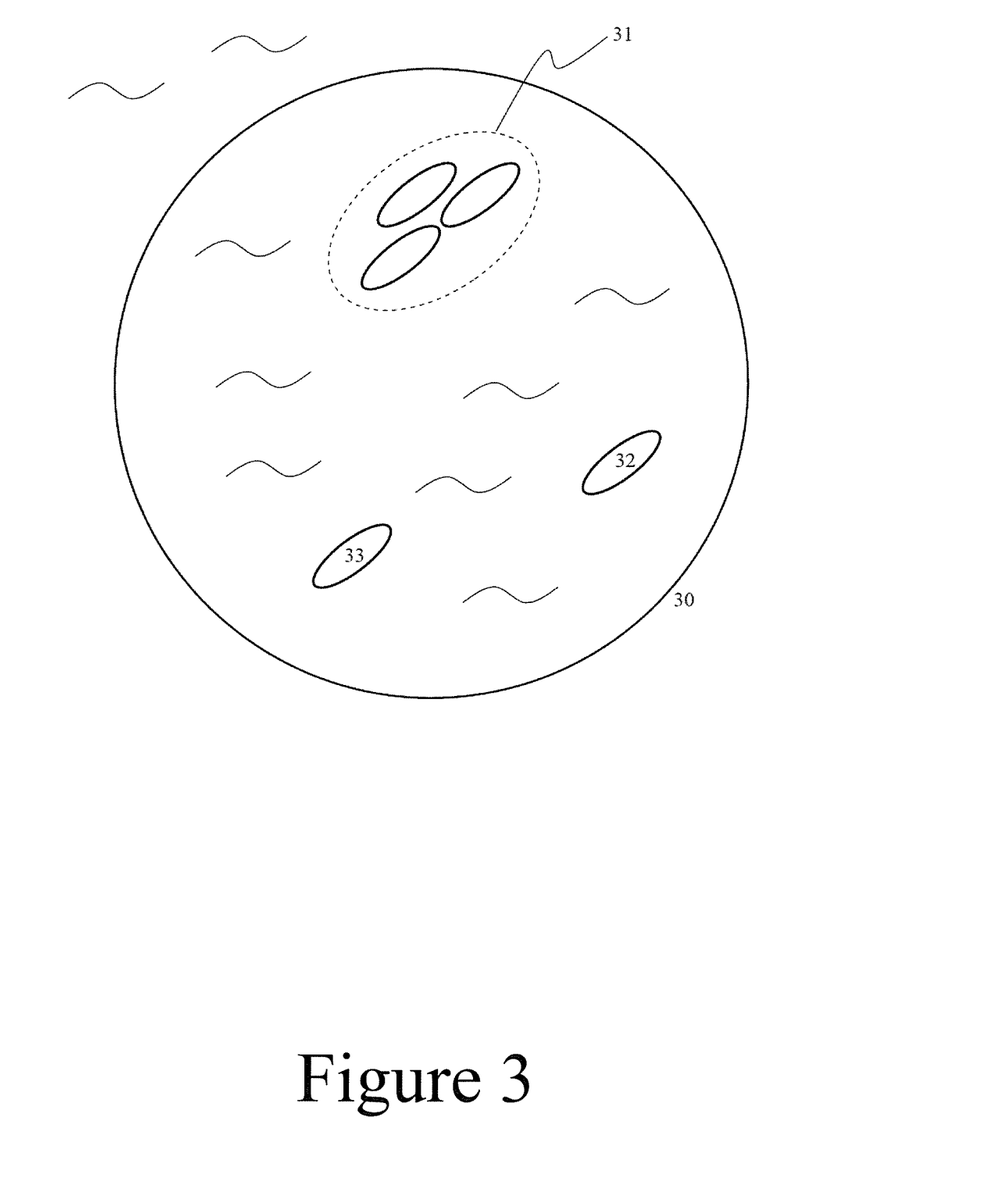
FIG. 3 shows a schematic illustration of the method for increased density of ships.

FIG. 3 schematically shows the reception region 30 of a satellite. On account of the very high altitude of a satellite, such a reception region 30 has a very large diameter, usually approximately 5000 to 6000 km. Therefore, such a reception region 30 of a satellite covers a multiplicity of ships emitting AIS radio signals. If ships now accumulate in a particular portion 31 of the reception region 30, for example, with an increase in the density of ships, then there is the risk of the high density of ships meaning that signal collisions occur for the AIS radio signals AIS3/AIS4 of the second AIS radio signal type, which means that no further usable AIS radio signals can be received throughout the reception region 30 of the satellites.

If the ships in the subregion 31 are equipped with an inventive AIS ship's transceiver 1 from FIG. 1, they can naturally ascertain the number of adjacent ships, whereupon the control unit 4 the AIS ship's transceiver 1 deactivates the AIS radio signals AIS3/AIS4 of the second radio signal type so as to reduce the risk of signal collisions in the reception region 30 of the satellite.

While the sending of the AIS radio signals of the second radio signal type is deactivated, ships outside this subregion 31 are not affected thereby, however, which means that the ships 32, 33 can also continue to emit their AIS radio signals to the satellite.

LIST OF REFERENCE SYMBOLS

1 AIS ship's transceiver
2 AIS radio transmission unit
2a AIS transmission antenna
3 AIS radio reception unit
3a AIS reception antenna
4 Control unit
5 GPS interface
6 GPS receiver
7 Coast database
8 GS database
10 Adjacent ships
11 Satellite
12 AIS ground station
13 AIS reception station
21, 22, 23 Ships with an AIS ship's transceiver
302 Reception region
K Coastline
$E_R$ Reference distance from the coast

The invention claimed is:

1. An Automatic Identification System (AIS) ship's transceiver that is provided for installation on a ship in order to be able to send and receive AIS radio signals containing ship data, comprising:
   an AIS radio transmission unit that is designed to send AIS radio signals of a first AIS radio signal type that contain ship data, wherein the AIS radio signals of the first AIS radio signal type are provided for the interchange of ship data from the ships among one another, and that is designed to send transmit AIS radio signals of a second AIS radio signal type that contain ship data, wherein the AIS radio signals of the second AIS radio signal type are provided for reception by a satellite and for transmission of the ship data that the AIS radio signals of the second AIS radio signal type contain to a ground station by means of the satellite,
   an AIS radio reception unit that is designed to receive AIS radio signals of the first AIS radio signal type that have been emitted by AIS ship's transceivers on adjacent ships,
   a control unit that is set up
      a) to deactivate and/or to activate the sending of the AIS radio signals of the second AIS radio signal type by the AIS radio transmission unit on the basis of a current ship position ascertained by a position finding unit, and/or
      b) to deactivate and/or to activate the sending of the AIS radio signals of the second AIS radio signal type by the AIS radio transmission unit on the basis of a number of adjacent ships, and
   a database that stores the positions of coastlines, wherein the control unit is connected to access the database and is set up to ascertain the distance of the ship from the coast using the current position of the ship and the positions of the coastline that are stored in the database, and to deactivate and/or to activate the sending of the AIS radio signals of the second AIS radio signal type in point a) on the basis of the ascertained distance of the ship from the coast.

2. The AIS ship's transceiver according to claim 1, wherein the control unit is set up to deactivate the sending of the AIS radio signals of the second AIS radio signal type in point a) when the ascertained distance of the ship from the coast drops below a prescribed reference distance and/or to activate the sending of the AIS radio signals of the second AIS radio signal type in point a) when the ascertained distance of the ship from the coast exceeds a prescribed reference distance.

3. An Automatic Identification System (AIS) ship's transceiver that is provided for installation on a ship in order to be able to send and receive AIS radio signals containing ship data, comprising:
   an AIS radio transmission unit that is designed to send AIS radio signals of a first AIS radio signal type that contain ship data, wherein the AIS radio signals of the first AIS radio signal type are provided for the interchange of ship data from the ships among one another, and that is designed to send transmit AIS radio signals of a second AIS radio signal type that contain ship data, wherein the AIS radio signals of the second AIS radio signal type are provided for reception by a satellite and for transmission of the ship data that the AIS radio signals of the second AIS radio signal type contain to a ground station by means of the satellite, an AIS radio reception unit that is designed to receive AIS radio signals of the first AIS radio signal type that have been emitted by AIS ship's transceivers on adjacent ships, a control unit that is set up
  a) to deactivate and/or to activate the sending of the AIS radio signals of the second AIS radio signal type by the AIS radio transmission unit on the basis of a current ship position ascertained by a position finding unit, and/or
  b) to deactivate and/or to activate the sending of the AIS radio signals of the second AIS radio signal type by the AIS radio transmission unit on the basis of a number of adjacent ships, wherein the AIS ship's transceiver control unit is set up to ascertain the number of adjacent ships in point b) on the basis of received AIS radio signals of the first AIS radio signal type that have been emitted by the adjacent ships, and the control unit is set up to deactivate the sending of the AIS radio signals of the second AIS radio signal type in point b) when the ascertained number of adjacent ships exceeds a prescribed reference number and/or to activate the sending of the AIS radio signals of the second AIS radio signal type in point b) when the ascertained number of adjacent ships drops below the prescribed reference number.

4. An Automatic Identification System (AIS) ship's transceiver that is provided for installation on a ship in order to be able to send and receive AIS radio signals containing ship data, comprising:

an AIS radio transmission unit that is designed to send AIS radio signals of a first AIS radio signal type that contain ship data, wherein the AIS radio signals of the first AIS radio signal type are provided for the interchange of ship data from the ships among one another, and that is designed to send transmit AIS radio signals of a second AIS radio signal type that contain ship data, wherein the AIS radio signals of the second AIS radio signal type are provided for reception by a satellite and for transmission of the ship data that the AIS radio signals of the second AIS radio signal type contain to a ground station by means of the satellite, an AIS radio reception unit that is designed to receive AIS radio signals of the first AIS radio signal type that have been emitted by AIS ship's transceivers on adjacent ships, a control unit that is set up
  a) to deactivate and/or to activate the sending of the AIS radio signals of the second AIS radio signal type by the AIS radio transmission unit on the basis of a current ship position ascertained by a position finding unit, and/or
  b) to deactivate and/or to activate the sending of the AIS radio signals of the second AIS radio signal type by the AIS radio transmission unit on the basis of a number of adjacent ships, and a database that stores data for valid AIS ground stations, wherein the control unit is connected to access the database and is set up to follow reception of an AIS ground station message, which is emitted by an AIS ground station and which is intended to be used to deactivate and/or to activate the sending of the AIS radio signals of the second AIS radio signal type by the AIS ship's transceiver, by validating the sending AIS ground station on the basis of the data in the AIS ground station message regarding the sending AIS ground station and the data pertaining to the sending AIS ground station that are stored in the database, and to deactivate and/or to activate the sending of the AIS radio signals of the second AIS radio signal type on the basis of the validation.

5. A method for the sending and the receiving of Automatic Identification System (AIS) radio signals containing ship data by an AIS ship's transceiver, comprising the steps of:

transmitting AIS radio signals of a first radio signal type that contain ship data and that are provided for the interchange of ship data from the ships among one another are sent by an AIS radio transmission unit, transmitting AIS radio signals of a second radio signal type that contain ship data and that are provided for reception by a satellite and for the transmission of the ship data that the AIS radio signals of the second AIS radio signal type contain to a ground station by means of the receiving satellite are sent by the AIS radio transmission unit, and receiving AIS radio signals of the first radio signal type that contain ship data and that have been emitted by AIS ship's transceivers on adjacent ships are received by an AIS radio reception unit, characterized by
  a) deactivating or activating of the sending transmitting of the AIS radio signals of the second AIS radio signal type on the basis of a current ship position ascertained by a position finding unit by a control unit, and/or
  b) deactivating or activating of the sending the step of transmitting of the AIS radio signals of the second AIS radio signal type on the basis of a number of adjacent ships by a control unit, wherein the control unit is connected to a database that stores the positions of coastlines, further comprising the steps of:

ascertaining the distance of the ship from the coast is ascertained by the control unit using the a current position of the ship and the positions of the coastline that are stored in the database, and deactivating or activating the sending the step of transmitting of the AIS radio signals of the second AIS radio signal type is deactivated or activated by the control unit in step a) on the basis of the ascertained distance of the ship from the coast, second AIS radio signal type on the basis of a number of adjacent ships by a control unit.

6. The method according to claim 5, wherein the sending step of transmitting of the AIS radio signals of the second AIS radio signal type is deactivated by the control unit in step a) when the ascertained distance of the ship from the coast drops below a prescribed reference distance, or the sending step of transmitting of the AIS radio signals of the second AIS radio signal type is activated by the control unit in step a) when the ascertained distance of the ship from the coast exceeds the prescribed reference distance.

7. A method for the sending and the receiving of Automatic Identification System (AIS) radio signals containing ship data by an AIS ship's transceiver, comprising the steps of:

transmitting AIS radio signals of a first radio signal type that contain ship data and that are provided for the interchange of ship data from the ships among one another are sent by an AIS radio transmission unit, transmitting AIS radio signals of a second radio signal type that contain ship data and that are provided for reception by a satellite and for the transmission of the ship data that the AIS radio signals of the second AIS radio signal type contain to a ground station by means of the receiving satellite are sent by the AIS radio transmission unit, and receiving AIS radio signals of the first radio signal type that contain ship data and that have been emitted by AIS ship's transceivers on adjacent ships are received by an AIS radio reception unit,
  a) deactivating or activating of the sending transmitting of the AIS radio signals of the second AIS radio signal type on the basis of a current ship position ascertained by a position finding unit by a control unit, and/or
  b) deactivating or activating of the step of transmitting of the AIS radio signals of the second AIS radio signal type on the basis of a number of adjacent ships by a control unit,
wherein the step of ascertaining the number of adjacent ships is ascertained by the AIS transceiver in step b) on the basis of received AIS radio signals of the first AIS radio signal type that have been emitted by the adjacent ships, and
wherein the step of transmitting of the AIS radio signals of the second AIS radio signal type is deactivated by the control unit in step b) when the ascertained number of adjacent ships exceeds a prescribed reference number, or the sending the step of transmitting of the AIS radio signals of the second AIS radio signal type is activated by the control unit in step b) when the ascertained number of adjacent ships drops below the prescribed reference number.

8. A method for the sending and the receiving of Automatic Identification System (AIS) radio signals containing ship data by an AIS ship's transceiver, comprising the steps of:
  transmitting AIS radio signals of a first radio signal type that contain ship data and that are provided for the interchange of ship data from the ships among one another are sent by an AIS radio transmission unit,
  transmitting AIS radio signals of a second radio signal type that contain ship data and that are provided for reception by a satellite and for the transmission of the ship data that the AIS radio signals of the second AIS radio signal type contain to a ground station by means of the receiving satellite by the AIS radio transmission unit,
  receiving AIS radio signals of the first radio signal type that contain ship data and that have been emitted by AIS ship's transceivers on adjacent ships are received by an AIS radio reception unit, characterized by
    a) deactivating or activating of the transmitting of the AIS radio signals of the second AIS radio signal type on the basis of a current ship position ascertained by a position finding unit by a control unit, and/or
    b) deactivating or activating of the step of transmitting of the AIS radio signals of the second AIS radio signal type on the basis of a number of adjacent ships by a control unit,
  wherein the control unit is connected to a database that stores data regarding valid AIS ground stations, wherein reception of further comprising the steps of:
  receiving an AIS ground station message, which is emitted by an AIS ground station and which is intended to be used to deactivate and/or to activate the sending the step transmitting of the AIS radio signals of the second AIS radio signal type by the AIS ship's transceiver, is followed by the sending
  validating the AIS ground station being validated on the basis of the data in the AIS ground station message regarding the sending AIS ground station and the data pertaining to the sending AIS ground station that are stored in the database, and
  sending deactivating or deactivating of the step of transmitting AIS radio signals of the second AIS radio signal type is deactivated or activated by the control unit on the basis of the validation.

9. An Automatic Identification System (AIS) ship's transceiver that is provided for installation on a ship in order to be able to send and receive AIS radio signals containing ship data, comprising:
  an AIS radio transmission unit that is designed to send AIS radio signals of a first AIS radio signal type that contain ship data, wherein the AIS radio signals of the first AIS radio signal type are provided for the interchange of ship data from the ships among one another, and that is designed to send transmit AIS radio signals of a second AIS radio signal type that contain ship data, wherein the AIS radio signals of the second AIS radio signal type are provided for reception by a satellite and for transmission of the ship data that the AIS radio signals of the second AIS radio signal type contain to a ground station by means of the satellite,
  an AIS radio reception unit that is designed to receive AIS radio signals of the first AIS radio signal type that have been emitted by AIS ship's transceivers on adjacent ships,
  a control unit that is set up
    a) to deactivate and/or to activate the sending of the AIS radio signals of the second AIS radio signal type by the AIS radio transmission unit on the basis of a current ship position ascertained by a position finding unit, and/or
    b) to deactivate and/or to activate the sending of the AIS radio signals of the second AIS radio signal type by the AIS radio transmission unit on the basis of a number of adjacent ships,
  further comprising at least one of:
  a first database that stores the positions of coastlines, wherein the control unit is connected to access the first database and is set up to ascertain the distance of the ship from the coast using the current position of the ship and the positions of the coastline that are stored in the database, and to deactivate and/or to activate the sending of the AIS radio signals of the second AIS radio signal type in point a) on the basis of the ascertained distance of the ship from the coast, and/or
  a second database that stores data for valid AIS ground stations, wherein the control unit is connected to access the second database and is set up to follow reception of an AIS ground station message, which is emitted by an AIS ground station and which is intended to be used to deactivate and/or to activate the sending of the AIS radio signals of the second AIS radio signal type by the AIS ship's transceiver, by validating the sending AIS ground station on the basis of the data in the AIS ground station message regarding the sending AIS ground station and the data pertaining to the sending AIS ground station that are stored in the database, and to deactivate and/or to activate the sending of the AIS radio signals of the second AIS radio signal type on the basis of the validation.

10. A method for the sending and the receiving of Automatic Identification System (AIS) radio signals containing ship data by an AIS ship's transceiver, comprising the steps of:
  transmitting AIS radio signals of a first radio signal type that contain ship data and that are provided for the interchange of ship data from the ships among one another are sent by an AIS radio transmission unit, transmitting AIS radio signals of a second radio signal type that contain ship data and that are provided for reception by a satellite and for the transmission of the ship data that the AIS radio signals of the second AIS radio signal type contain to a ground station by means of the receiving satellite by the AIS radio transmission unit, receiving AIS radio signals of the first radio signal type that contain ship data and that have been emitted by AIS ship's transceivers on adjacent ships are received by an AIS radio reception unit, a) deactivating or activating of the transmitting of the AIS radio signals of the second AIS radio signal type on the basis of a current ship position ascertained by a position finding unit by a control unit, and/or
   b) deactivating or activating of the sending the step of transmitting of the AIS radio signals of the second AIS radio signal type on the basis of a number of adjacent ships by a control unit, wherein the control unit is connected to at least one of a first database that stores the positions of coastlines and/or a second database that stores data regarding valid AIS ground stations, further comprising the steps of:

ascertaining the distance of the ship from the coast by the control unit using a current position of the ship and the positions of the coastline that are stored in the first database, deactivating or activating the step of transmitting of the AIS radio signals of the second AIS radio signal type by the control unit in step a) on the basis of the ascertained distance of the ship from the coast, receiving an AIS ground station message, which is emitted by an AIS ground station and which is intended to be used to deactivate and/or to activate the step of transmitting of the AIS radio signals of the second AIS radio signal type by the AIS ship's transceiver, validating the AIS ground station on the basis of the data in the AIS ground station message regarding the sending AIS ground station and the data pertaining to the sending AIS ground station that are stored in the second database, and deactivating or deactivating of the step of transmitting AIS radio signals of the second AIS radio signal type by the control unit on the basis of the validation.

* * * * *